June 17, 1941.    H. E. SIPE    2,245,728
DEVICE FOR CIRCUMFERENTIALLY GROOVING TIRE SURFACES
Filed Dec. 20, 1939
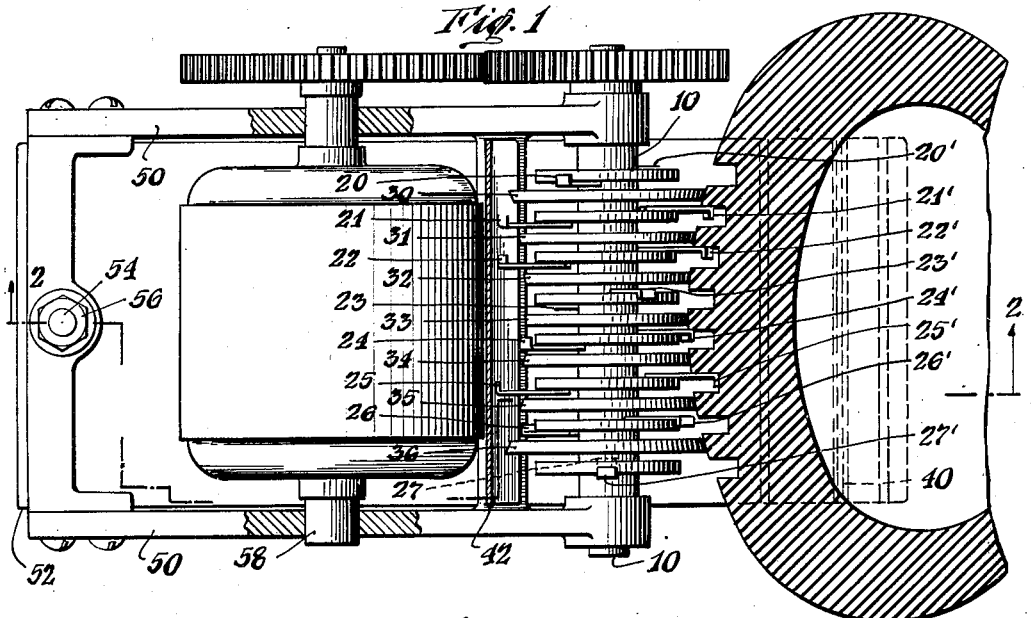
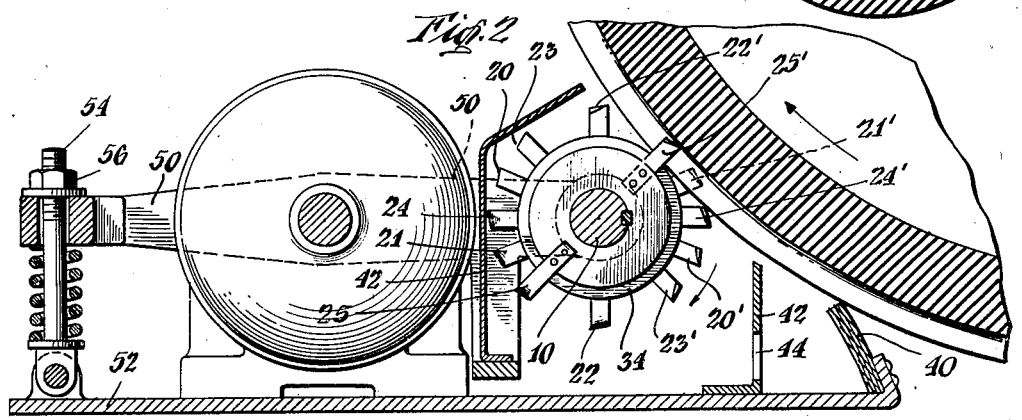
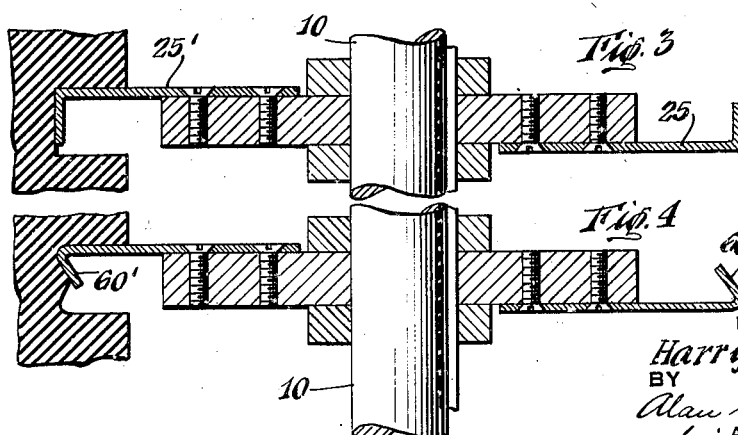
INVENTOR
Harry E. Sipe
BY
Alan M. Mann
ATTORNEY Patented June 17, 1941

2,245,728

UNITED STATES PATENT OFFICE 2,245,728

DEVICE FOR CIRCUMFERENTIALLY GROOVING TIRE SURFACES

Harry E. Sipe, New York, N. Y.

Application December 20, 1939, Serial No. 310,114

3 Claims. (Cl. 90—20)

When the tread of pneumatic tires has been worn smooth, it is common practice to retread the tire by cutting new grooves in the tire surface. The grooves are cut either circumferentially or transversely, or both. This invention relates to a device for cutting the grooves circumferentially.

The device of my invention consists essentially of a plurality of groove forming knives mounted on a rotatable shaft. The knives are so mounted that the cutting edges of the knives describe concentric paths and cut circumferential grooves in the tire surface to the extent that the tire intersects the paths described by the cutting edges of the knives. These knives are positioned on the shaft along transverse and longitudinal planes and each rotates in a transverse plane around the axis of the shaft. It is an essential of the device of my invention that knives adjacent to each other on the longitudinal plane shall lie, on their respective transverse planes, at angular differentials to each other, and, preferably, no one knife shall lie in the same longitudinal plane as any two or three knives on either side. The knives are spaced along the longitudinal plane at points corresponding to each of the circumferential grooves to be cut in the tire surface.

Preferably, two L-shaped knives are mounted so that the centers of their cutting edges are diametrically opposite on the transverse plane around the shaft but the radial portions are relatively offset. The advantage of diametrically mounting the groove cutting knives is that an efficient structure is obtained in which the two knives complement each other in the cutting operation. Thus, one knife cuts a portion of a longitudinal groove in the tire surface and the other knife completes the grooving operation by cutting the remaining portion of the longitudinal groove. In neither case does one knife cut and remove all the rubber from the groove: a set of complementary knives being required to cut a complete longitudinal groove in the tire surface. Obviously, more than two knives may be employed to like effect.

The resistance of rubber to the cutting edge of a knife is very great. It is for this reason that I provide, first, cutting knives mounted at angular differentials in the transverse plane and spaced along the longitudinal plane so that adjacent knives lie at angular differentials to each other, and, second, complementary cutting knives on the transverse plane each of which is adapted to cut portions of the longitudinal groove but no one of which is capable of cutting a complete groove.

By having a plurality of knives spaced along the longitudinal plane of the shaft and mounted at angular differentials to each other, displacement and distortion of the rubber during the cutting operation is avoided. If a plurality of knives were to cut into the tire at adjacent grooves at the same time, displacement of the rubber would distort the contour of the grooves.

By providing a plurality of complementary knives to cut a single groove in the tire surface in the same transverse plane (no one knife completing the cutting operation), I reduce the resistance of the rubber to the cutting edge of the knife and eliminate clogging of rubber scraps in the knives.

In the device of my invention I provide knives with either inside or outside cutting edges. Where but a single knife is used and this knife completes the cutting operation for each groove, the cutting edge must necessarily be the outside edge of the knife. If the cutting edge were on the inside, rubber would be displaced between the walls of the knife and this displacement (e. g. the displacement between the side walls of a U-shaped knife) materially increases the resistance of the rubber to the knife and definitely impairs the cutting operation. Excessive displacement makes it difficult to cut a continuous grove of uniform width. In the device of my invention I use knives having a cutting edge on either the inside or the outside of the blade, for there is no confined area into which the rubber can be displaced.

A plurality of complementary knives acting on the tire surface during the cutting operation is advantageous in another respect. It permits the rubber, after being cut, to fly free leaving a clean-cut groove in the tire surface.

Ordinarily, a set of complementary cutting knives will consist of two L-shaped knives mounted on the shaft so that one knife will cut one side wall and a portion of the base of the groove and the other knife will cut the other side wall and the remaining portion of the base of the groove. I have found it advisable to have a substantial overlapping of the cutting edges of the knives at the base of the groove. A simple groove has two substantially right angles at the base on the transverse plane; but obviously differently shaped grooves may be formed and the cutting knives will be shaped accordingly. For example, a particularly efficient groove is formed by using two knives diametrically and oppositely mounted, each of which has a cutting edge lying in a single plane on the radial portion of the knife: the paths described by the knives intersecting within the tire surface to form a V-shaped groove.

The depth of penetration of the cutting knives into the tire surface is determined by rotatable discs mounted on the shaft between the cutting knives. These discs ride on the tire surface and the cutting edges of the knives are adjusted relative to the periphery of the discs so that the depth of the grooves may be accurately determined.

A cutting device, illustrative of my invention, is shown in the accompanying drawing.

Fig. 1 is a top view partly in section;

Fig. 2 is a vertical section through the line 2—2 of Fig. 1; and

Figs. 3 and 4 are enlarged sections taken diametrically through pairs of complementary cutting knives.

Fig. 3 shows a complementary pair of L-shaped knives and Fig. 4 shows a variant of Fig. 3 at 60—60' as to the configuration of the knife and the corresponding groove.

The cutting knives are mounted on a shaft 10 driven by a motor. On the shaft are mounted eight complementary paired cutting knives together with seven disc-like gauges. The cutting knives are shown in the drawing as 20—20', 21—21', 22—22', 23—23', 24—24', 25—25', 26—26', and 27—27'. The disc-like gauges are shown at 30—31—32—33—34—35—36 the periphery of the gauges complementing the periphery of the tire surface at each point along the tire surface.

In the device shown in the drawing the complementary paired knives (20—20' to 27—27' inclusive) are mounted diametrically opposite each other around the shaft 10. Each pair of diametrically mounted knives is approximately equidistant angularly around the axis of the shaft 10 with respect to adjacent pairs of knives. By arranging the knives equidistantly around the shaft 10 only one knife (cf. 25' in Fig. 1) is at the height of the cutting cycle at any given moment. The remaining knives are at different points in the cutting cycle at that moment. Only two or three of the sixteen knives (cf. 21' and 25' in Fig. 1) intersect the tire surfaces at the same time.

The shaft 10 rotates (at approximately 3000 R. P. M.) in a clockwise direction and the tire is rotated slowly in a counter-clockwise direction, the rate of rotation of the tire depending on the progress of the cutting operation. As the circumferential groove is cut in the tire, the tire is moved slowly around until the groove is completed.

A brake 40 is provided to prevent the shaft 10 from rotating the tire in a clockwise position.

The shaft 10 and the groove forming knives are encased in a housing 42 having an opening 44 at the base for the removal of rubber scrap.

One of the advantages of my device is that the grooving operation can be accomplished by simply jacking up the wheel of the vehicle and positioning my device under it. After the device has been brought into position at the base of the tire surface, accurate adjustment can be obtained between the cutting knives and the tire surface by means of the arm 50. At one end of the arm 50 is mounted the shaft 10 carrying the groove forming knives; and at the other end the arm is adjustably positioned between a spring and a nut 56. The arm 50 is fulcrumed about the shaft 58; and by adjusting the nut 56 the knives on the shaft 10 can be accurately positioned relative to the tire surface and held in that position. The device should be made stationary when moved into cutting position at the base of the tire.

The specific device shown in the drawing is illustrative of a device made in accordance with my invention. Various modifications of that device can be made without departing from the concept of my invention.

What I claim is:

1. In a device for grooving a tire surface, a rotatable shaft, a plurality of groove forming knives mounted on the shaft and rotatable in a transverse plane around the longitudinal axis of the shaft, said knives being mounted so that the cutting edges of the knives describe concentric paths and are adapted to cut grooves in a tire surface to the extent that the paths described by the cutting edges of the knives intersect the surface of a tire, said knives being positioned on the shaft along transverse and longitudinal planes, each knife being mounted so as to rotate in a transverse plane around the axis of the shaft, but knives adjacent to each other on the longitudinal plane being so disposed that, on their respective transverse planes, they lie at angular differentials to each other, whereby displacement of the rubber by the cutting action of the knives is reduced so that straight grooves can be cut in the tire surface.

2. A device as specified in claim 1 in which no one knife lies in the same transverse plane as any two knives on either side.

3. A device as specified in claim 1 in which no one knife lies in the same transverse plane as any other knife on the shaft.

HARRY E. SIPE.